Patented June 7, 1927.

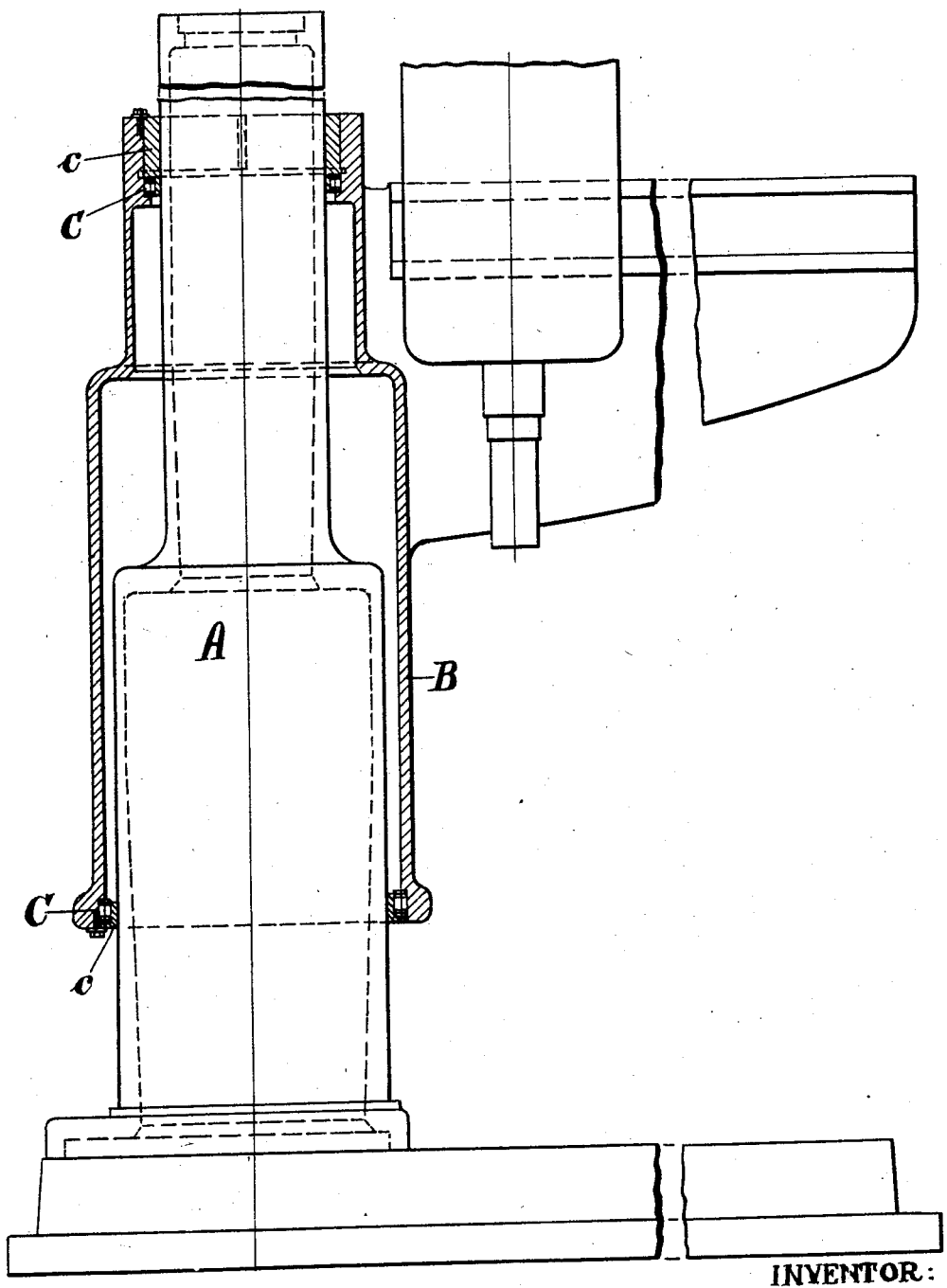

1,631,256

UNITED STATES PATENT OFFICE.

GEORGE FEATHER, OF HALIFAX, ENGLAND.

RADIAL DRILLING MACHINE.

Application filed February 17, 1926, Serial No. 88,878, and in Great Britain February 24, 1925.

This invention relates to radial drilling machines of the kind in which the radial arm is mounted directly on the drill pillar instead of upon a sleeve which is rotatably mounted thereon, the chief object of the present invention being to increase the strength and rigidity of the drill pillar without increasing or materially increasing the minimum radius at which the drill spindle is capable of working and also to keep the weight of the drill pillar and arm socket down to the lowest practical limit.

According to this invention the drill pillar is made of two or more diameters and the arm socket is formed with two or more bearing surfaces or collars to fit the different diameters.

In order that the said invention may be clearly understood and readily carried into effect, the same is described more fully with reference to the accompanying drawing which shows a drill pillar and arm socket constructed in accordance with this invention.

In the construction shown the drill pillar A is made with two diameters and the arm socket B formed with two bearing surfaces or collars, the upper bearing surface or collar fitting the smaller diameter of the pillar and the lower bearing surface or collar fitting the larger diameter of the pillar. These bearing surfaces are arranged at a considerable distance apart to provide increased support for the arm and the intermediate portion of the socket may be U shaped, or be cut away where practicable with a view to reducing weight. Antifriction bearings C are advantageously interposed between the upper and lower bearing surfaces of the collar and the pillar and such bearing surfaces may comprise endless roller chains C interposed between rings $c$ which make a close fit with the pillar A so that although the arm socket B can rise and fall thereon the friction between the rings and the pillar will cause rotation to take place between the rings $c$ and the arm socket B by way of the antifriction chains C. It is of course essential and necessary that the upper and lower portions of the pillar, which are of different diameters, each be of a vertical height greater than the maximum distance of vertical movement of the arm socket, and that the bearings of the arm socket be spaced apart farther than said maximum distance of movement.

What I claim as my invention and desire to secure by Letters Patent in the United States is:—

1. A radial drilling machine comprising a pillar having a lower portion of one diameter and an upper portion of smaller diameter, and an arm socket having lower and upper portions slidable freely upwardly and downwardly on and corresponding in diameters to said lower and upper portions of the pillar, respectively, each of said portions of the pillar being of a vertical height greater than the maximum distance of vertical movement of the arm socket, and said portions of the arm socket being spaced apart farther than said maximum distance of movement.

2. A radial drilling machine comprising a pillar having a lower portion of one diameter and an upper portion of smaller diameter, an arm socket having lower and upper portions corresponding in diameters to and surrounding said lower and upper portions of the pillar, respectively, and bearings within the lower and upper ends of said arm socket and movable freely upwardly and downwardly with said socket on the lower and upper portions of the pillar, each of said portions of the pillar being of a vertical height greater than the maximum distance of vertical movement of the arm socket, and said bearings being spaced apart farther than said maximum distance of movement.

In testimony whereof I affix my signature.

G. FEATHER.